Figure 1:
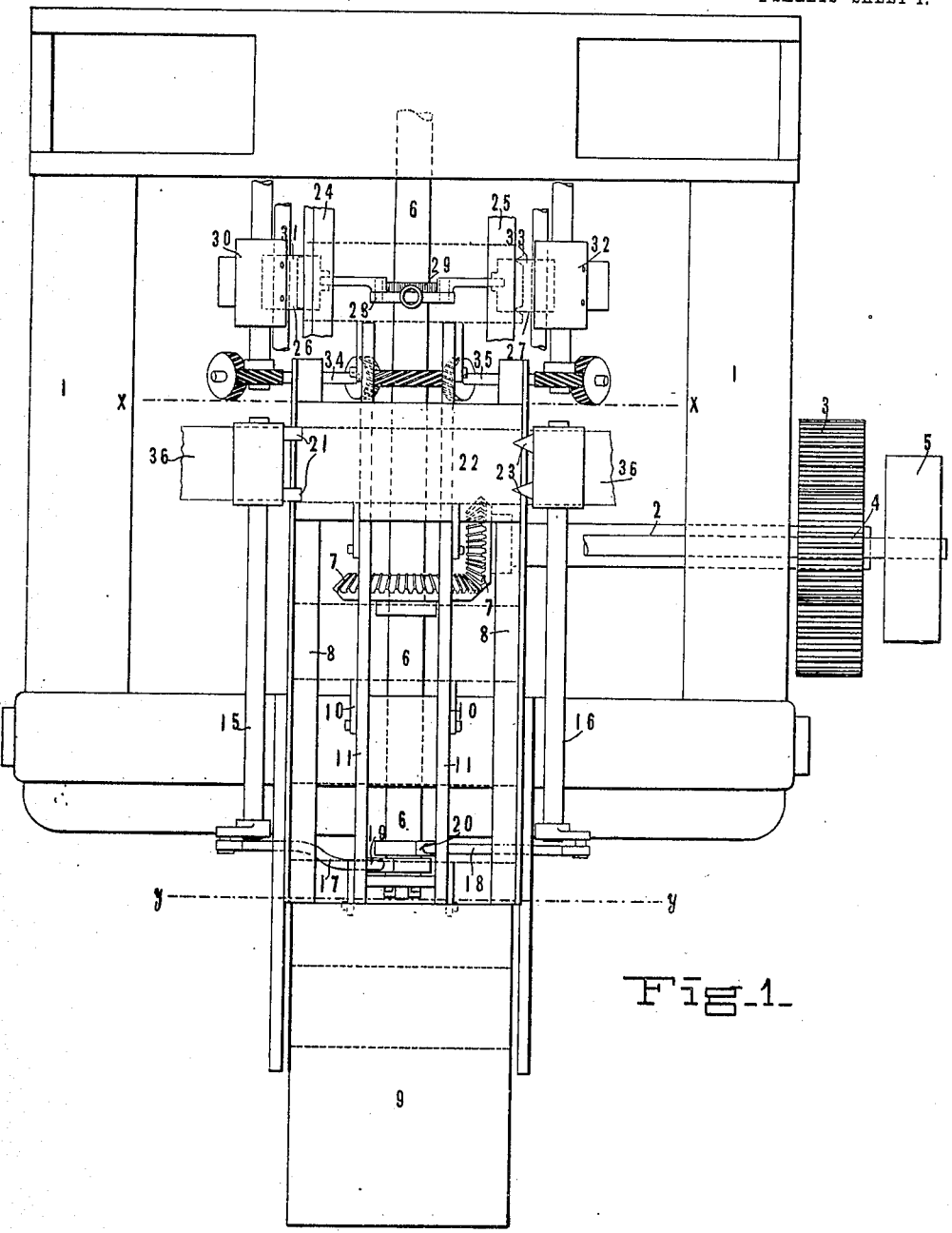

C. W. GRAHAM.
BLANK SHAPING MACHINE.
APPLICATION FILED DEC. 28, 1906.
920,131.
Patented May 4, 1909.
2 SHEETS—SHEET 2.
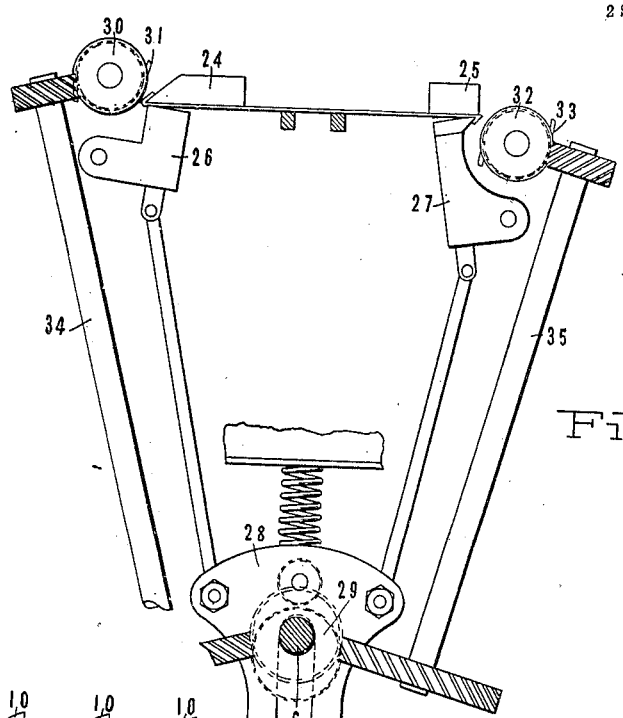
Fig. 2.
Fig. 4.
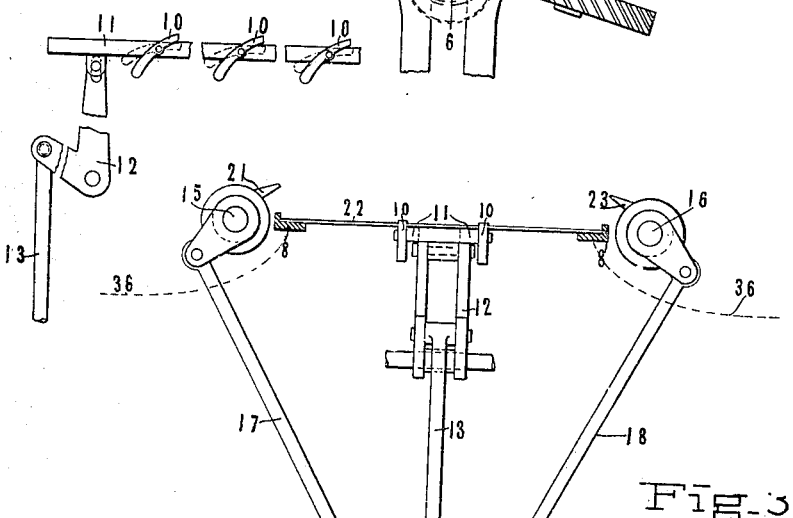
Fig. 3.
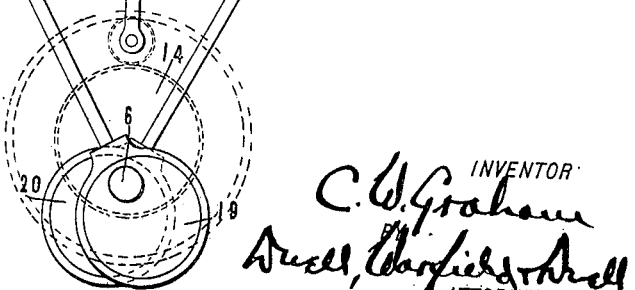
WITNESSES
INVENTOR
C. W. Graham
ATTORNEYS.

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

BLANK-SHAPING MACHINE.

No. 920,131.

Specification of Letters Patent.

Patented May 4, 1909.

Application filed December 28, 1906. Serial No. 349,785.

*To all whom it may concern:*

Be it known that I, CHARLES W. GRAHAM, residing at Rome, in the county of Oneida and State of New York, have invented certain new and useful Improvements in Blank-Shaping Machines, of which the following is a full, clear, and exact description, such as will enable others skilled in the art to which it appertains to make and use the same.

This invention relates to machinery for shaping blanks, and more specifically to machinery for preparing blanks for use in forming can bodies.
One of the objects thereof is to provide efficient and practical means for forming a blank of a predetermined contour.

Another object is to provide means of the above type for forming a blank of a predetermined conformation.

A more specific object is to provide means of the above type for so shaping a blank as to adapt it for use in the formation of a can body having a combined lap and interlocking seam.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.
In the accompanying drawings, wherein is shown one of various possible embodiments of my invention,—Figure 1 is a plan thereof. Fig. 2 is a cross-section taken along the line $x-x$ of Fig. 1. Fig. 3 is a similar view, taken along the line $y-y$ of Fig. 1, certain parts being omitted in order to show the construction more clearly. Fig. 4 is a detail view of the feeding mechanism.

Similar reference characters refer to similar parts throughout the several views of the drawings.

Referring now to the accompanying drawings, there is shown a machine comprising a frame 1 upon which is mounted a shaft 2 driven as by the gears 3 and 4 from a pulley 5. Shaft 2 is adapted to drive a shaft 6 as by the bevel gears 7, and from the latter shaft the power is drawn for the immediate driving of the several parts of the machine as hereinafter described.

Mounted upon frame 1 are a pair of supporting rails 8 preferably of angle cross-section, with the horizontal flanges inwardly disposed. These rails are adapted to receive blanks as from the table 9, and support and guide them throughout a portion of the machine as hereinafter described. The blanks are intermittently fed along and from the rails 8 by a series of pairs of dogs 10 mounted upon the carriage 11, the latter member being provided with suitable guides, and reciprocated as by the slotted bell crank lever 12 rocked from the shaft 6, through link 13, by cam 14. These dogs or pawls are weighted or spring pressed so as normally to occupy the position indicated in full lines in Fig. 4 of the drawings, and upon being retracted are adapted to pass beneath the blank to the rear thereof without disturbing the same, by reason of their assuming the position indicated in dotted lines as shown.

Mounted adjacent the rails 8 are rock shafts 15 and 16 respectively actuated by links 17 and 18 from eccentrics 19 and 20 upon the shaft 6. These eccentrics are so disposed upon the shaft as to raise the links 17 and 18 substantially simultaneously to the upward limit of their paths of travel, and thus swing the shafts 15 and 16 substantially in unison.

Upon shaft 15 is mounted a pair of dies 21, preferably of such conformation as to be adapted to cut from a blank positioned upon the rails as indicated by the dotted lines at 22, rectangular corner portions thereof.

Upon shaft 16 is mounted a pair of dies 23 of such conformation and disposition as to be adapted to cut the blank intermediate the ends thereof, which in the illustrative embodiment herein set forth results in the formation of substantially V-shaped incisions in the blank.

Adjacent the ends of rails 8 are a pair of abutments 24 and 25 respectively co-acting with rocking jaws 26 and 27 to engage the blank adjacent its edges, as indicated in Fig. 2 of the drawings. Jaws 26 and 27 are rocked as by links from the spring depressed cross head 28, intermittently raised as by cam 29 upon shaft 6. Journaled adjacent abutment 24 is a rotary member 30 provided with blades or projections 31, and adjacent abutment 25 is a similar rotary member 32 provided with blades 33. These members are rotated as by the inclined shafts 34 and 35 from the shaft 6, the suitable spiral gearing indicated being provided to accomplish this function. The blades 31 and 33 are so formed and positioned as respectively to engage the projecting portions of the blank, which upon one side is comprehended between the above-described cut away corner parts thereof and upon the other side is positioned between the incisions formed therein. The several parts are so timed, moreover, as to accomplish this bending or flanging of the edge substantially simultaneously with the gripping of the blank by the swinging jaws 26 and 27, and thus insure a uniformity in the result which might otherwise be lacking. Suitable chutes 36 are provided, as shown, to lead the cuttings away from the rails 8.

It may here be noted that the term "flange" is used throughout this description and in the following claims in a broad sense as denoting the bending of the edge portion of a member out of the plane of the member, irrespective of the degree to which such bending is carried. It may also be noted at this point that the term "incision" is used throughout to denote, unless otherwise qualified, any cutting into a body whereby certain of the severed edges are either parallel or form an acute angle one with another.

The operation of the above-described embodiment of my invention is substantially as follows:—Assuming blanks to be positioned upon a support 9 and fed within the path of travel of the first set of dogs 10, the same are intermittently fed throughout the length of the rails 8, and occupy in one of their positions of rest the relation to the dies 21 and 23 indicated in Fig. 1 of the drawings. The action of the parts is such that upon the blank reaching this position the corresponding dies are thrown downwardly into engagement therewith, and co-acting with suitable slots in the rails 8 accomplish the cutting away of portions of the edge thereof, as above set forth. It will be obvious that this movement of the dies may be brought about by the expedient of mounting the same upon slides rather than rock shafts, and many of the broader features of this invention be retained, but certain advantages are found to reside in the disposition of the parts herein set forth.

From the position adjacent the above dies, indicated at 22, the blank is engaged by the next succeeding pair of dogs and fed beneath the abutments 24 and 25. The outer portions are then clamped by the swinging jaws 26 and 27, and the edges flanged in opposite directions as indicated in Fig. 2 of the drawings. From these last-mentioned jaws the blank may be removed and any desired disposition made of the same, but it is intended that the same shall be so bent as to interlock the flanged edge portions thereof and provide a can body having a seam portions of which are of the interlocking type and portions of which, namely those corresponding to the edge outside of the incisions formed by dies 23, form a lap joint, thus facilitating the securing of the head to the can body.

It will thus be seen that I have provided apparatus in which the several objects of my invention are achieved, and that the same, while of simple and inexpensive construction, is nevertheless durable and reliable in action.

The entire operation of the machine above set forth is automatic, and may be carried on at a high rate of speed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which as a matter of language might be said to fall therebetween.

Having described my invention, what I claim as new and desire to secure by Letters Patent is:—

1. In apparatus of the class described, in combination, means adapted to cut away portions of one edge of a blank at the corners thereof, flanging means, means adapted to hold said blank with the portion thereof comprehended between said first portions in operative relation to said flanging means, and flanging means in operative relation with the intermediate portion of the opposite edge of said blank and out of operative relation to the end portions of said edge which lie opposite the cut away portions of said first mentioned edge, whereby the end portions of said second mentioned edge are left in unflanged condition.

2. In apparatus of the class described, in combination, means adapted to form a pair of incisions in one edge of a blank, said incisions being spaced one from another, flanging means, and means adapted to hold said blank with a portion of said edge comprehended between said incisions in operative relation to said flanging means and the portions of the edge at each side of said incisions out of operative relation to said flanging means, whereby the first-mentioned portion is flanged and the second-mentioned portions remain in an unflanged condition.

3. In apparatus of the class described, in combination, means adapted to form a pair of V-shaped incisions in one edge of a blank, said incisions being spaced one from another, flanging means, means adapted to hold the portion of said edge comprehended between said incisions in operative relation to said flanging means and the portions of the edge at each side of said incisions out of operative relation to said flanging means whereby the first-mentioned portion is flanged and the second-mentioned portions remain in an unflanged condition.

4. In apparatus of the class described, in combination, means adapted to cut away portions of one edge of a blank adjacent the corners thereof, means adapted to form a pair of spaced incisions in the opposite edge of said blank, and means adapted to flange the portions of said edges comprehended between said first-mentioned portions and between said incisions, the portions of said second edge at each side of said spaced incisions remaining in an unflanged condition.

5. In apparatus of the class described, in combination, means adapted to support a blank, a pair of dies, means adapted to actuate said dies to form a pair of spaced incisions in one edge of a blank upon said supporting means, means adapted to hold said blank adjacent the edge thereof, and means adapted to strike and bend the portion of said edge comprehended between said incisions, the portions of the blank at each side of said incisions remaining in an unflanged condition.

6. In apparatus of the class described, in combination, means adapted to support a blank, a pair of dies upon each side of said supporting means, means adapted to actuate one of said pairs of dies to engage the adjacent edge of a blank upon said supporting means and cut away portions thereof adjacent the corners of the blank, means adapted to actuate the other of said pairs of dies and form a pair of spaced incisions in the opposite edge of the blank, means adapted to hold said blank adjacent each of said edges, and means adapted to strike and bend the portions of each of said edges comprehended between said first-mentioned portion and between said incisions.

7. In apparatus of the class described, in combination, blank supporting means, a pair of dies, means adapted to throw said dies into engagement with a blank upon said supporting means and form a pair of incisions therein intermediate the ends thereof, means adapted to shift the blank subsequent to the action of said dies, means adapted to clamp said blank adjacent said edge with the portion comprehended between said incisions projecting therefrom, and means adapted to strike and bend said projecting portion of said blank, the portions of the blank at each side of said incisions remaining in an unflanged condition.

8. In apparatus of the class described, in combination, blank supporting means, a pair of dies, means adapted to throw said dies into engagement with a blank upon said supporting means and form a pair of incisions therein, means adapted to shift the blank subsequent to the action of said dies, means adapted to clamp said blank adjacent said edge with the portion comprehended between said incisions projecting therefrom, and means adapted to strike and bend said projecting portion of said blank, the portions of the blanks at each side of said incisions remaining in an unflanged condition.

9. In apparatus of the class described, in combination, supporting means, a pair of dies mounted at each side of said supporting means, means adapted to throw one of said pairs of dies into engagement with the adjacent edge of a blank upon said supporting means and cut away portions thereof, means adapted to throw the other of said pairs of dies into engagement with the edge of said blank adjacent thereto and form a pair of spaced incisions therein, means adapted to shift the blank subsequent to the action of said several dies, means adapted to clamp said blank adjacent each of said edges therewith the portions of said edges comprehended between said first portions and between said incisions projecting therefrom, and means adapted to strike and bend each of said projecting edge portions of said blank.

10. In apparatus of the class described, in combination, a pair of supporting rails, means adapted intermittently to feed a blank along said rails, a pair of dies mounted at each side of said rails, means adapted to move each of said pairs of dies into engagement with the adjacent edge of a blank upon said rails and cut away portions of each of the same, one of said pairs of dies being formed and disposed to cut away the corner portions of the adjacent edge and the other of said pairs of dies being formed and disposed to form a pair of spaced V-shaped incisions therein intermediate the ends thereof, a plurality of pairs of jaws adapted respectively to grip said blank adjacent each edge thereof, means adapted to feed the blank from said rails between said jaws, and means mounted adjacent each of said pairs of jaws adapted to strike and bend the adjacent edge of said blank projecting from said jaws.

11. In apparatus of the class described, in combination, a pair of supporting rails, means adapted intermittently to feed a blank along said rails, a pair of dies mounted at each side of said rails, means adapted to move each of said pairs of dies into engagement with the adjacent edge of a blank upon said rails and cut away portions of each of the same, one of said pairs of dies being formed and disposed to cut away the corner portions of the adjacent edge and the other of said pairs of dies being formed and disposed to form a pair of spaced V-shaped incisions therein intermediate the ends thereof, a plurality of pairs of jaws adapted respectively to grip said blank adjacent each edge thereof, means adapted to feed the blank from said rails between said jaws, means mounted adjacent each of said pairs of jaws adapted to strike and bend the adjacent edge of said blank projecting from said jaws, and a pair of chutes respectively positioned adjacent said pairs of dies and adapted to receive the parts cut thereby from the blank and lead the same away from said rails.

12. In apparatus of the class described, in combination, flanging means, and means adapted to hold a blank with a portion of one edge thereof in operative relation to said flanging means and the remaining portion of said edge out of operative relation thereto, whereby a portion of said edge is flanged and the remainder left in unflanged condition.

13. In apparatus of the class described, in combination, blank supporting means, a pair of dies positioned at each side of said blank supporting means, means adapted to move one of said pairs of dies to cut from a blank upon said supporting means rectangular portions at the corners thereof, and, means adapted to move the other of said pairs of dies to cut from the opposite edge of said blank a pair of V-shaped portions intermediate the corners thereof.

14. In apparatus of the class described, in combination, blank supporting means, a pair of dies positioned at each side of said blank supporting means, means adapted to move one of said pairs of dies to cut from a blank upon said supporting means rectangular portions at the corners thereof, means adapted to move the other of said pairs of dies to cut from the opposite edge of said blank a pair of V-shaped portions intermediate the corners thereof, and means adapted to actuate said pairs of dies substantially simultaneously.

15. In apparatus of the class described, in combination, blank supporting means, a shaft mounted adjacent said blank supporting means, a pair of dies mounted upon said shaft, and means adapted intermittently to rock said shaft to throw said dies into engagement with a blank upon said supporting means, said dies being formed and disposed to cut therefrom rectangular corner portions thereof.

16. In apparatus of the class described, in combination, blank supporting means, a shaft mounted adjacent said blank supporting means, a pair of dies mounted upon said shaft, and means adapted intermittently to rock said shaft to throw said dies into engagement with a blank upon said supporting means, said dies being formed and disposed to cut therefrom a pair of V-shaped portions intermediate the corners thereof.

17. In apparatus of the class described, in combination, blank supporting means, a shaft mounted on each side of said supporting means, a pair of dies mounted upon each of said shafts, and means adapted to rock said shafts to throw said several dies into substantially simultaneous engagement with the blank upon said supporting means, one of said pairs of dies being so formed and disposed as to cut corner portions from the adjacent edge of the blank and the other of said dies being so formed and disposed as to form a pair of spaced incisions in the opposite edge of the blank.

18. In apparatus of the class described, in combination, blank supporting means, a shaft mounted on each side of said supporting means, a pair of dies mounted upon each of said shafts, means adapted to rock said shafts to throw said several dies into substantially simultaneous engagement with a blank upon said supporting means, one of said pairs of dies being so formed and disposed as to cut corner portions from the adjacent edge of the blank and the other of said pairs of dies being so formed and disposed as to form a pair of spaced incisions in the adjacent edge of the blank, and a chute positioned adjacent each of said pairs of dies adapted to receive parts cut from said blank and carry the same away from said supporting means.

19. In apparatus of the class described, in combination, a pair of blank supporting rails, means adapted intermittently to feed a blank along said rails, a driving shaft, a rock shaft at each side of said rails, a pair of eccentrics upon said driving shaft, means co-acting with said eccentrics adapted to actuate said rock shafts, a pair of dies mounted upon each of said rock shafts adapted to be thrown into engagement with a blank upon said rails, one of said pairs of dies being so formed and disposed as to cut substantially rectangular portions from the blank and the other of said pairs of dies being so formed and disposed as to cut substantially V-shaped portions from the adjacent edge of said blank intermediate the corners thereof, a plurality of pairs of clamping jaws, means adapted to actuate said clamping jaws from said driving shaft, means adapted to feed the blank from said dies into a position between said clamping jaws with one of said edges projecting from each of said jaws, and means adapted to flange the portion of one of said edges comprehended between said incisions and the portions of the other of said edges comprehended between said first-mentioned portions thereof.

20. In apparatus of the class described, in combination, a pair of blank supporting rails, means adapted intermittently to feed a blank along said rails, a driving shaft, a rock shaft at each side of said rails, a pair of eccentrics upon said driving shaft, means co-acting with said eccentrics adapted to actuate said rock shafts, a pair of dies mounted upon each of said rock shafts adapted to be thrown into engagement with a blank upon said rails, one of said pairs of dies being so formed and disposed as to cut substantially rectangular portions from the blank and the other of said pairs of dies being so formed and disposed as to cut substantially V-shaped portions from the adjacent edge of said blank intermediate the corners thereof, a plurality of pairs of clamping jaws, means adapted to actuate said clamping jaws from said driving shaft, means adapted to feed the blank from said dies into a position between said clamping jaws with one of said edges projecting from each of said jaws, means adapted to flange the portion of one of said edges comprehended between said incisions and the portions of the other of said edges comprehended between said first-mentioned portions thereof, and a pair of chutes one of which is positioned adjacent each of said pairs of dies adapted to receive therefrom portions cut from the blanks and carry the same laterally away from said rails.

In testimony whereof I affix my signature, in the presence of two witnesses.

CHARLES W. GRAHAM.

Witnesses:
WARD J. CAGWIN,
W. T. KELLEY.